2 Sheets—Sheet 1.

E. W. GLOVER.

FIRE-PROOF COVERS FOR BOOKS.

No. 7,487. Reissued Feb. 6, 1877.

Edward W. Glover
Inventor.

Attest:
H. L. Perrine
A. H. Norris.

By James L. Norris.
Attorney.

N. PETERS, PHOTO-LITHOGRAPHER, WASHINGTON, D. C.

2 Sheets—Sheet 2.

E. W. GLOVER.

FIRE-PROOF COVERS FOR BOOKS.

No. 7,487. Reissued Feb. 6, 1877.

Edward W. Glover.
Inventor.

Attest:
H. L. Perrine
A. H. Norris

James L. Norris.
Attorney.

N. PETERS, PHOTO-LITHOGRAPHER, WASHINGTON, D. C.

UNITED STATES PATENT OFFICE.

EDWARD W. GLOVER, OF MALDEN, MASSACHUSETTS.

IMPROVEMENT IN FIRE-PROOF COVERS FOR BOOKS.

Specification forming part of Letters Patent No. 169,536, dated November 2, 1875; reissue No. 7,487, dated February 6, 1877; application filed January 18, 1877.

*To all whom it may concern:*

Be it known that I, EDWARD W. GLOVER, of Malden, in the county of Middlesex and State of Massachusetts, have invented certain Improvements in Fire-Proof Coverings for Books, of which the following is a specification:

The object of the present invention is to provide an efficient and non-conducting fire-proof binding or backs of ordinary books; also, to provide a fire-proof protector for the leaves of a book, that may be readily removed when the book is to be used, and secured upon and over the leaves when the book is to be packed away when not required for use, whereby the binding of the book is effectually preserved from the effects of a fire, and the leaves of the book likewise protected and preserved. The invention is more especially designed for the preservation of valuable books, such as the account-books of bankers and merchants; and the invention consists in providing the back or binding of a book with a covering of canvas or other textile material impregnated and rendered fire-proof by the application of suitable fireproofing chemicals or agents, such as tungstate of soda, borax, alum, borax and alum combined, sulphate of copper or ammonia, common salt, or salt combined with any of the before-named ingredients, as will more fully hereinafter appear.

The invention further consists in a non-conducting and fire-proof covering or protector for the leaves of a book, that may be readily removed when the book is to be used, or applied to the same when the book is to be packed away or put up when not required for use, said protector entirely inclosing the leaves, and effectually preserving the same in case the books are exposed to fire.

My invention is particularly designed for the protection of valuable books, such as the account-books of bankers and merchants; and it consists, also, of a rectangular box open on one side, and provided with a hinged flap or cover, or of such shape as to conform to the shape of the book, and of such size as to fit closely over the leaves of the book and between the covers of the binding, so as to entirely inclose the leaves when in place, as will be hereinafter more fully set forth.

Figure 1:
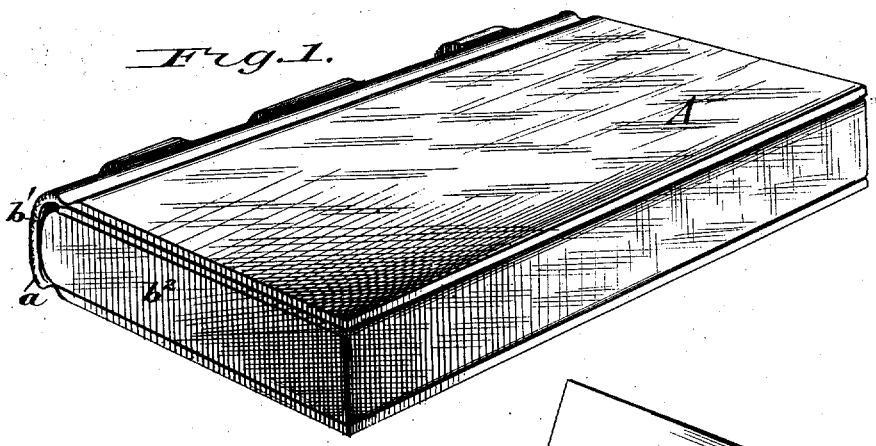
Figure 2:
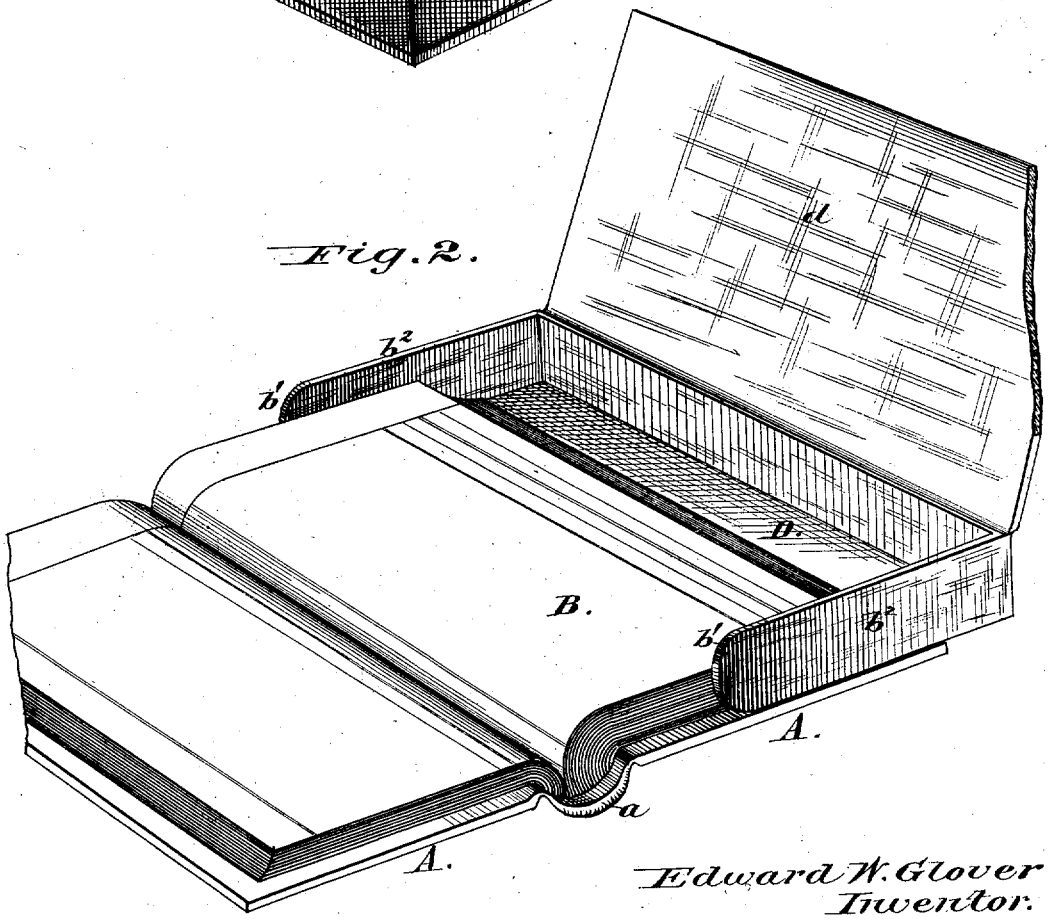
Figure 3:
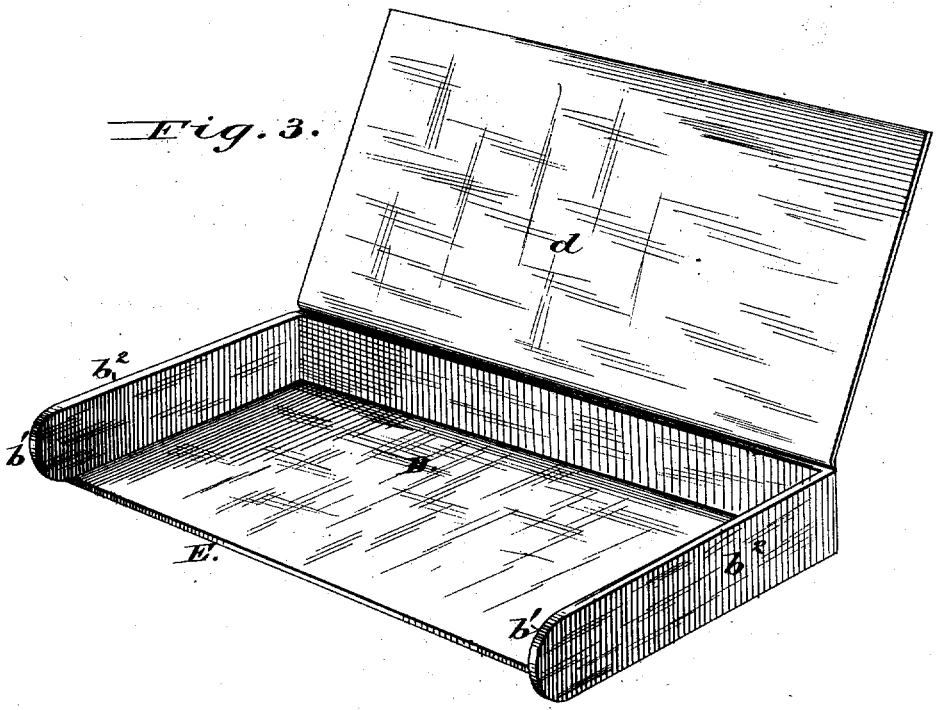
Figure 4:
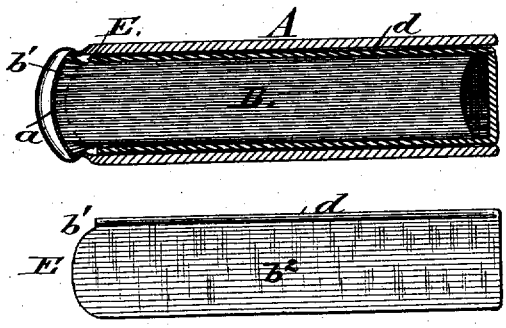

In the drawings, Figure 1 represents a perspective view of the book with the protecting-cover in place. Fig. 2 represents a perspective view of the book open, and with the cover partly drawn off. Fig. 3 represents a perspective view of the protecting-cover removed, and Fig. 4 a transverse section of the closed book and cover.

The letter A represents the binding or back of the book, constructed of any of the usual materials employed for the purpose; but it is preferably composed of what is termed in the market as "clay-board," which is rendered perfectly fire-proof by the employment or application of tungstate or silicate of soda, borax, alum, borax and alum combined, sulphate of copper or ammonia, common salt, or salt combined with any of the hereinbefore-named ingredients; or the back may be provided with any other material which will effectually and thoroughly render such back fire-proof, and prevent the transmission of heat to the leaves of the book in case the book should be subjected to fire. The exterior of the binding or back may be finished or covered with any of the fabrics used for the purpose, such as canvas or other material employed to finish or cover the back or binding of the book, and which is impregnated or provided with a suitable fireproofing substance or substances, such as hereinbefore named.

The letter B represents the leaves, which are made up in the well-known manner as practiced by book-binders.

The binding or back of the book, as thus constructed, will most effectually and thoroughly protect the book from damage by fire, inasmuch as the back or binding is rendered perfectly fire-proof, air is excluded from the same, and combustion prevented, even when the material is hot enough to burn if exposed to the atmosphere; and, moreover, the back or binding performs the usual functions.

The letter D represents the covering or protector for the leaves, which is constructed of a rectangular or other shaped box corresponding to the shape and size of the leaves, and it is provided with an open end, E, and hinged or pivoted cover or flap *d*. This box, like the binding or back of the leaves, is constructed of any of the usual materials employed in binding books, but preferably of the clay-alumina board, which may also have asbestus combined with it, rendered incombustible or fire-proof, as above mentioned, and covered and finished with the same material, and in a manner similar to the binding. The upper and lower ends $b^1$ $b^1$ of said cover are rounded, as shown, to fit snugly against the concave back *a* of the binding A, and securely inclose the leaves of the book when in place. The box is constructed of such size as to fit snugly all around the edges of the leaves and within the binding when the book is closed, in such manner that the binding, together with said box, will form a protective casing, entirely surrounding and inclosing the leaves when packed together in a safe, vault, or other safe depository, or upon suitable shelves.

It is evident that the cover might be constructed in the form of a rectangular box with an open end, the side *d* being securely attached instead of hinged, and the whole slipped over the leaves previously to closing the book; but the construction represented in the drawing is preferable. The hinged flap or cover of the protecting-box may also be made triangular or similar in shape to an envelope-flap, or curved or hollowed out along its free edge, as may be desired; and, instead of being hinged to the side edge of the rectangular box, it may be hinged to either the top or bottom edges $b^2$ of the same.

The protecting-cover is applied to the book by raising the hinged lid *d* and, setting the leaves in the same, pushing it home until the ends of the sides $b^2$ set closely in the concave ends of the back *a*. The covers of the binding are then closed, embracing the protecting-cover, and forming, as it were, a tight box, inclosing the leaves.

When the book is in use the protecting-cover is drawn off and laid aside.

Although my improvement is principally designed to protect the contents of books from fire, it is evident that it will operate as well in protecting them from smoke, dust, dirt, and atmospheric influences, in which case it will not be necessary to construct the same of fire-proof or non-conducting materials.

The book and protecting-cover may be made and sold together; or the protecting-cover may be made in various sizes and sold separately, for the convenience of those having books already in use.

Having thus described my invention, what I claim, and desire to secure by Letters Patent, is—

1. The back or binding of a book constructed with a covering of canvas or other textile material, impregnated and rendered fire-proof by the application of suitable fireproofing chemicals, substantially as described.

2. The combination, with the binding and leaves of a book, of a fire-proof protecting-cover, composed of an open box adapted to fit closely over the leaves and between the binding, and forming a tight inclosing-box around the leaves, substantially as described.

In testimony that I claim the foregoing I have signed my name to this specification before two subscribing witnesses.

EDWARD W. GLOVER.

Witnesses:
GEO. C. POULTON,
JOS. L. COOMBS.